US012589416B2

(12) United States Patent
Trinkle et al.

(10) Patent No.: US 12,589,416 B2
(45) Date of Patent: Mar. 31, 2026

(54) PRESSURE WASHER APPARATUS

(71) Applicant: Andreas Stihl AG & Co. KG, Waiblingen (DE)

(72) Inventors: Simon Trinkle, Kaisersbach (DE); Christopher Tost, Auenwald (DE); Richard Fresow, Remseck (DE); Lukas Zuercher, Ludwigsburg (DE); Michael Renz, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 390 days.

(21) Appl. No.: 18/319,088

(22) Filed: May 17, 2023

(65) Prior Publication Data

US 2023/0381829 A1 Nov. 30, 2023

(30) Foreign Application Priority Data

May 24, 2022 (EP) .................................... 22175191

(51) Int. Cl.
*B08B 3/02* (2006.01)
*B08B 13/00* (2006.01)

(52) U.S. Cl.
CPC .............. *B08B 3/026* (2013.01); *B08B 13/00* (2013.01); *B08B 2203/0205* (2013.01);
(Continued)

(58) Field of Classification Search
CPC . B08B 3/026; B08B 13/00; B08B 2203/0205; B08B 2203/0223; B08B 2203/0229; B08B 2203/027
(Continued)

(56) References Cited

U.S. PATENT DOCUMENTS 2,537,310 A * 1/1951 Lapp .................. F04D 13/0646 417/357
4,802,313 A * 2/1989 Smith ...................... B24C 5/02 251/109
(Continued)

FOREIGN PATENT DOCUMENTS

DE 10 2004 031 951 B3 11/2005
DE 10 2006 009 855 A1 9/2007
(Continued)

OTHER PUBLICATIONS

EnglishWO2007101599ByGooglePatents (Year: 2007).*

*Primary Examiner* — Chee-Chong Lee
(74) *Attorney, Agent, or Firm* — Walter Ottesen, P.A.

(57) ABSTRACT

A pressure washer includes a main line through which, via a high-pressure pump, liquid can be conveyed to a spray opening, and a main valve. The main valve, when in a closed state, prevents liquid from flowing through the main line and, when in an open state, allows liquid to flow through the main line. The main valve is switchable between open and closed via an operator-controlled element. The main line has a suction chamber between the connection and the pump and a pressure chamber between the pump and the spray opening. The pressure chamber is fluidically connected to the suction chamber via a bypass line. A free cross-sectional area of the bypass line is settable via a bypass valve in the bypass line for regulating pressure in the pressure chamber. The bypass valve is adjustable via the operator-controlled element for setting the free cross-sectional area of the bypass line.

17 Claims, 2 Drawing Sheets

(52) U.S. Cl.
CPC ................. *B08B 2203/0223* (2013.01); *B08B 2203/0229* (2013.01); *B08B 2203/027* (2013.01)

(58) Field of Classification Search
USPC .......................................................... 239/526
See application file for complete search history.

(56) References Cited

U.S. PATENT DOCUMENTS

| | | | | | |
|---|---|---|---|---|---|
| 4,814,632 | A * | 3/1989 | Glaeser | B24C 7/00<br>307/115 |
| 4,893,027 | A * | 1/1990 | Kammerer | H03K 17/9517<br>324/207.2 |
| 4,914,721 | A * | 4/1990 | Glaeser | F16P 3/12<br>307/115 |
| 4,920,281 | A * | 4/1990 | Harris | H03K 17/951<br>340/552 |
| 5,249,612 | A * | 10/1993 | Parks | B67D 7/348<br>141/351 |
| 2005/0285024 | A1 * | 12/2005 | Eubelen | G01S 17/48<br>250/221 |
| 2017/0239676 | A1 | 8/2017 | Kristensen | |
| 2019/0388923 | A1 | 12/2019 | Giacalone et al. | |

FOREIGN PATENT DOCUMENTS

| | | | |
|---|---|---|---|
| EP | 1 060 800 | A2 | 12/2000 |
| EP | 1 060 800 | A3 | 1/2002 |
| EP | 2 985 083 | A1 | 2/2016 |
| JP | S51-36101 | U | 3/1976 |
| WO | 2016/102075 | A1 | 6/2016 |

* cited by examiner

PRESSURE WASHER APPARATUS

CROSS-REFERENCE TO RELATED APPLICATIONS

This application claims priority of European patent application no. 22 175 191.0, filed May 24, 2022, the entire content of which is incorporated herein by reference.

BACKGROUND

Known from WO 2016/102075 A1 is a pressure washer apparatus in which the pressure in the pressure chamber of the pressure washer apparatus can be adjusted in stages. For this purpose, there is an input unit arranged on the gun of the pressure washer apparatus. The input unit for adjustment of the pressure in stages is realized separately from an actuating lever that serves to open a valve in the main line of the pressure washer apparatus. Only when this main line valve is opened via the operating lever can water be sprayed from the gun of the pressure washer apparatus. A pressure level is selected via the input unit, and then the main line valve is opened using the operating lever. Adjustment of the pressure level while liquid is being sprayed is possible only with inconvenience; during spraying, the control lever is pressed with one finger, and either the second hand or the thumb must be used to adjust the pressure. Operating the pressure washer apparatus with one hand is then only possible with difficulty.

It is an object of the disclosure to provide a pressure washer apparatus wherein the pressure can be conveniently adjusted.

This object is, for example, achieved by a pressure washer apparatus including:

a connection for a liquid source; a high-pressure pump; a main line through which, via the high-pressure pump, liquid can be conveyed from the connection to a spray opening of the main line; a main line valve arranged in the main line; an operator-controlled element; the main line valve being configured, when in a closed state, to prevent liquid from flowing through the main line; the main line valve being configured, when in an open state, to allow liquid to flow through the main line; the main line valve being switchable between the open state and the closed state via the operator-controlled element; the main line having a suction chamber between the connection and the high-pressure pump; the main line having a pressure chamber between the high-pressure pump and the spray opening; the pressure chamber being fluidically connected to the suction chamber via a bypass line; a bypass valve arranged in the bypass line; the bypass line defining a free cross-sectional area settable via the bypass valve for regulating a pressure in the pressure chamber; and, the bypass valve being adjustable via the operator-controlled element for setting the free cross-sectional area of the bypass line.

According to the disclosure, the main line valve, when in a closed state, prevents liquid from flowing through the main line and, when in an open state, allows liquid to flow through the main line. The main line valve is switchable between the open and the closed state via the operator-controlled element. The main line has a suction chamber between the connection and the high-pressure pump. The main line has a pressure chamber between the high-pressure pump and the spray opening. The pressure chamber is fluidically connected to the suction chamber via a bypass line. There is bypass valve arranged in the bypass line. A free cross-sectional area of the bypass line is settable via the bypass valve for the purpose of regulating the pressure in the pressure chamber. The larger the free cross-sectional area of the bypass line, the greater is the volume flow of cleaning liquid that can flow through the bypass line under otherwise unchanged conditions. The fact that the regulation of the pressure in the pressure chamber is effected via a bypass valve means that the pressure washer apparatus can be produced at low cost. The regulation of the pressure is entirely non-dependent on the type of motor used. Accordingly, a low-cost motor can be used and at the same time regulation of the pressure is possible. There is thus no need for a cost-intensive speed control for a motor. Expensive measures such as, for example, the integration of a frequency converter or the implementation of a phase-angle control can be avoided.

According to the disclosure, it is provided that the bypass valve can be adjusted via the operator-controlled element for the purpose of setting the free cross-sectional area of the bypass line. Actuation of the operator-controlled element allows both the main line valve can be switched between the open and the closed state and the free cross-sectional area of the bypass line to be set via the bypass valve. This makes it possible to conveniently set the pressure in the pressure chamber, even while liquid is being sprayed out through the spray opening. According to the disclosure, only the actuation of a single operator-controlled element is required both for switching the main line valve between the open state and the closed state and for adjusting the bypass valve. In particular, the pressure washer apparatus is configured such that the actuation of the main line valve, for the purpose of switching the main line valve between the open state and the closed state, and the actuation of the bypass valve, for the purpose of adjusting the bypass valve, can be triggered, in particular in succession, by actuation of the operator-controlled element via a continuous movement of a single finger.

In particular, the pressure washer apparatus is configured in such a way that the operator-controlled element must be continuously actuated in order for the main line valve to be in the open state.

In particular, the pressure washer apparatus has a handheld sprayer. The spray opening is expediently arranged on the handheld sprayer. Advantageously, the operator-controlled element is arranged on the handheld sprayer. The sprayer can be guided to direct a water jet emerging through the spray opening toward a particular object and, at the same time, the pressure in the pressure chamber can be easily set. Expediently, the sprayer includes a gun on which the operator-controlled element and the spray opening are arranged. It may be provided that the sprayer is realized solely by the gun. It may also be provided, however, that the sprayer includes a gun and a lance, and that the operator-controlled element is arranged on the gun and the spray opening is arranged on the lance.

In particular, the handheld sprayer includes a handle region. Expediently, a user can hold the handheld sprayer by gripping the handle region. Advantageously, the user can actuate the operator-controlled element with one finger while gripping the handle region. This makes it possible for the user, by actuating the operator-controlled element with one and the same finger, both to switch the main line valve between the open and the closed state and to set the free cross-sectional area of the bypass line by actuating the bypass valve. This allows particularly convenient use of the pressure washer apparatus. In particular, the operator-controlled element can be actuated without the use of the user's thumb while the handle region is being gripped. Expediently, the operator-controlled element can be operated by a single finger, namely the index finger, the middle finger, the ring finger or the little finger.

In an advantageous development of the disclosure, it is provided that the pressure washer apparatus includes a detector which is configured to detect an adjustment position of the operator-controlled element. In particular, the detector is configured to detect a plurality of different adjustment positions. In particular, the operator-controlled element is continuously adjustable to different adjustment positions within a range. Expediently, the detector is configured to detect any adjustment position within this continuous range.

Expediently, the detector is a potentiometer. In particular, the detector is a Hall sensor. This enables accurate detection of the adjustment position of the operator-controlled element, in particular within a range in which the operator-controlled element is continuously adjustable.

Expediently, the pressure washer apparatus is configured such that the bypass valve sets the size of the free cross-sectional area in dependence on the adjustment position of the operator-controlled element. In particular, the size of the free cross-sectional area can be continuously adjusted via the operator-controlled element. The combination of the continuous adjustability of the operator-controlled element with the dual function of the operator-controlled element with respect to the switching of the main line valve and the setting of the bypass valve results in a dynamic operating behavior of the pressure washer apparatus. The user of the pressure washer apparatus can increase the pressure briefly in an extremely convenient manner by moving the operator-controlled element, which the user has to operate in any case for the main line valve to be opened and for water to be sprayed out, to another adjustment position. The user can adjust the operator-controlled element to another adjustment position in particular by pressing the operator-controlled element with one finger.

Expediently, the bypass valve is adjustable via a positioning motor. This allows the free cross-sectional area of the bypass line to be set in a convenient manner. In particular, the bypass valve is adjustable via a signal triggered by the operator-controlled element. Preferably, the signal can be transmitted wirelessly. This minimizes the risk of a cable break. It can also be provided, however, that the signal is transmitted via a cable.

Expediently, the pressure washer apparatus includes a motor for driving the high-pressure pump. In particular, the motor is an induction motor. In particular, the motor is a brushless DC motor. The cost-effective use of these types of motor is made possible by the combination of the pressure regulation via the bypass valve with an induction motor or a brushless DC motor. Due to the bypass valve, no speed control is required for pressure regulation for these types of motor. Significant cost savings can be made as a result. This also makes it possible to achieve low-cost production even for a pressure washer apparatus intended for a higher performance class.

In an advantageous development of the disclosure, the pressure washer apparatus is configured such that the bypass valve is set such that the free cross-sectional area of the bypass line is maximal when the operator-controlled element is unactuated. This allows the maximum possible pressure equalization to be effected between the pressure chamber and the suction chamber when the operator-controlled element is not actuated. This minimizes the pressure applied to the main line valve. Expediently, the pressure washer apparatus is of such a structural configuration that, when the free cross-sectional area is maximal, the main line valve is switched from the closed to the open state via the operator-controlled element before a reduction of the free cross-sectional area of the bypass line triggered by the operator-controlled element. This ensures that the main line valve is opened before a pressure increase in the pressure chamber of the main line. This prevents a large pressure from being applied to the main line valve. The main line valve can thus be configured for much lower pressures. Cost savings can thus be made.

In particular, the pressure washer apparatus is of such a structural configuration that the free cross-sectional area of the bypass line is increased via the operator-controlled element before the main line valve is brought from the (partially) open state to the (fully) closed state via the operator-controlled element. This allows the pressure washer apparatus to be configured in such a way that the pressure in the pressure chamber is reduced before the main line valve is closed. This means that the main line valve is subjected to a lesser load when closing.

In an advantageous development of the disclosure, the operator-controlled element can be adjusted from the unactuated state, from a rest position, along a positioning path, into adjustment positions at an increasing distance from the rest position. Expediently, the pressure washer apparatus is configured such that, as the distance between the operator-controlled element and the rest position increases, the bypass valve reduces the free cross-sectional area of the bypass line. This allows pressure to be adjusted dynamically during operation of the pressure washer apparatus, in particular while liquid is being sprayed through the spray opening. The user can adjust the pressure continuously just by actuating the operator-controlled element. At the same time, the user can keep the main line valve open just by actuating the operator-controlled element. This combination allows intuitive operation of the pressure washer apparatus. In the case of places that are to be cleaned with an increased water pressure, the user can very conveniently increase the pressure for a short time by actuating the operator-controlled element more strongly, and then, in another place where a lower pressure of the cleaning liquid is required, reduce it again by reducing the distance of the operator-controlled element from its rest position.

In particular, the pressure washer apparatus is configured such that it is possible for the pressure in the pressure chamber to be set continuously via the operator-controlled element while liquid is being sprayed from the spray opening.

Advantageously, the operator-controlled element is a single component in which the functions of both the actuation of the main line valve and the actuation of the bypass valve are combined.

BRIEF DESCRIPTION OF DRAWINGS

The invention will now be described with reference to the drawings wherein.

DETAILED DESCRIPTION

Figure 1:
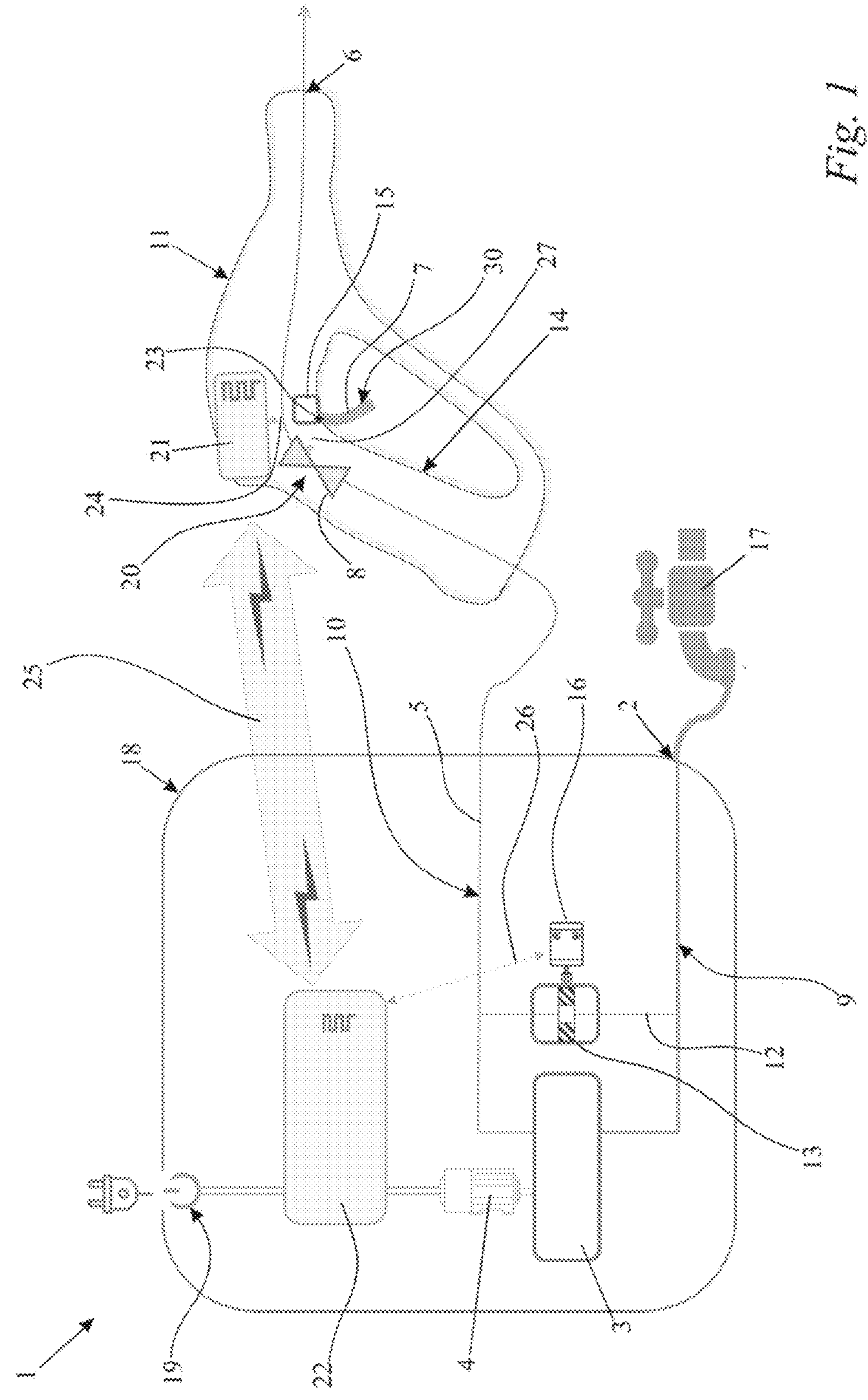
FIG. 1 shows a schematic representation of a pressure washer apparatus with an unactuated operator-controlled element and an open bypass valve; and, FIG. 2 shows a schematic representation of the pressure washer apparatus from FIG. 1 with an actuated operator-controlled element and a closed bypass valve.

FIG. 1 shows a pressure washer apparatus 1. The pressure washer apparatus 1 includes a pump unit 18 and a sprayer 11.

The pump unit 18 and the sprayer 11 are fluidically connected to each other via a main line 5. In the embodiment, the sprayer 11 is constituted by a gun. However, it may also be provided that the sprayer includes a gun and a lance.

The pressure washer apparatus 1 includes a connection 2 for a liquid source 17. In the embodiment, the liquid source 17 is an external liquid source. In the embodiment, the external liquid source is the faucet of a domestic water supply. It may also be envisaged that the liquid source is an integral constituent part of the pressure washer apparatus.

The high pressure washer apparatus 1 includes a spray opening 6. The high pressure washer apparatus 1 includes the main line 5. The main line 5 of the high pressure washer apparatus 1 fluidically connects the connection 2 to the spray opening 6. The connection 2 is arranged on the pump unit 18. The spray opening 6 is arranged on the sprayer 11. In the embodiment, the spray opening 6 is arranged on the sprayer 11 realized as a gun. It may also be provided, however, that the spray opening is arranged on a replaceable lance of the sprayer.

The high pressure washer apparatus 1 includes a high-pressure pump 3. Via the high-pressure pump 3, liquid can be conveyed through the main line 5 from the connection 2 to the spray opening 6. The liquid source 17 supplies liquid to the main line 5. The high-pressure pump 3 is arranged in the main line 5. The high-pressure pump 3 pressurizes the liquid. The high-pressure pump 3 is arranged between a suction chamber 9 and a pressure chamber 10 of the main line 5. The main line has the suction chamber 9 between the connection 2 and the high-pressure pump 3. The main line 5 has the pressure chamber 10 between the high-pressure pump 3 and the spray opening 6. In the embodiment, the suction chamber 9 is formed by a portion of the main line 5 between the connection 2 and the high-pressure pump 3. In the embodiment, the pressure chamber 10 is formed by a portion of the main line 5 between the high-pressure pump 3 and the spray opening 6. The high-pressure pump 3 conveys liquid from the suction chamber 9 to the pressure chamber 10. A higher pressure prevails in the pressure chamber 10 than in the suction chamber 9. The suction chamber 9 and the pressure chamber 10 are constituent parts of the main line 5. A higher pressure prevails in the main line 5 downstream of the high-pressure pump 3 than upstream of the high-pressure pump 3.

The high-pressure pump 3 is arranged in the pump unit 18. The high-pressure pump 3 is realized separately from the sprayer 11. Various sprayers can be connected to the high-pressure pump 3. The high pressure washer apparatus 1 has a motor 4 for driving the high-pressure pump 3. The motor 4 is arranged in the pump unit 18. The motor 4 may be realized as a brushless DC motor. A brushless DC motor is also referred to as an EC motor. The motor may also be a universal motor. In the embodiment, the motor 4 is an induction motor. In the case of an induction motor, a rotating magnetic field of the stator sets the rotor in motion. The induction motor in the embodiment is operated with AC voltage. The voltage source may be provided, for example, by the mains voltage. If battery or rechargeable battery operation is provided, the motor may also be a brushless DC motor. It may then be provided that the rechargeable battery is a constituent part of the pressure washer apparatus 1.

Figure 2:
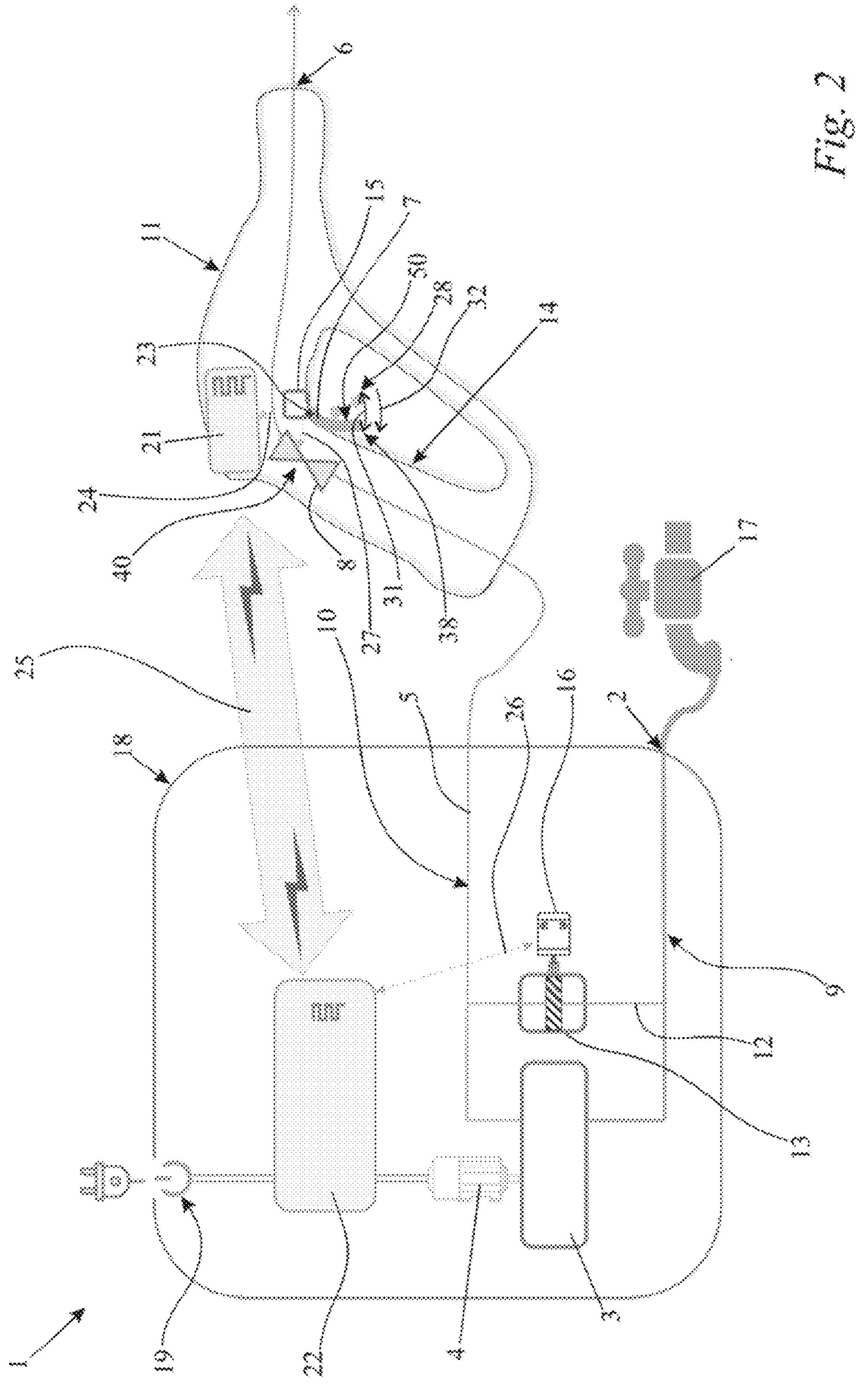

As represented in FIGS. 1 and 2, the pressure washer apparatus 1 includes a main switch 19. The main switch 19 serves to interrupt the electric power supply of the entire pressure washer apparatus 1. The main switch 19 is arranged on the pump unit 18.

The pressure washer apparatus 1 includes a main line valve 8. The main line valve 8 is arranged in the main line 5. The main line valve 8 has two valve states. The two valve states include a closed state 20 (FIG. 1) and an open state 40 (FIG. 2). When in the open state 40, the main line valve 8 allows liquid to flow through the main line. When in the closed state 20, the main line valve 8 prevents liquid from flowing through the main line 5. When the main line valve 8 is in the open state 40, liquid is sprayed out of the spray opening 6. When the main line valve 8 is in the closed state 20, no liquid is sprayed out of the spray opening 6. In the embodiment, the main line valve 8 is arranged in the sprayer 11. In the embodiment, the main line valve 8 is arranged between the high-pressure pump 3 and the spray opening 6. It may also be provided, however, that the main line valve is arranged in the pump unit. It may also be provided that the main line valve is arranged between the connection and the high-pressure pump.

The pressure washer apparatus 1 has an operator-controlled element 7. The operator-controlled element 7 is realized separately from the main switch 19. The main line valve 8 can be switched between the open state 40 and the closed state 20 via the operator-controlled element 7. In the embodiment, the operator-controlled element 7 is arranged on the sprayer 11.

The pressure washer apparatus 1 has a bypass line 12. Via the bypass line 12, the pressure chamber 10 is fluidically connected to the suction chamber 9. Via the bypass line 12, a further fluidic connection of suction chamber 9 and pressure chamber 10 is possible, separate from the fluidic connection of the suction chamber 9 to the pressure chamber 10 via the high-pressure pump 3.

The pressure washer apparatus 1 has a bypass line 12. The pressure chamber 10 is fluidically connected to the suction chamber 9 through the bypass line 12. Through the bypass line 12, a further fluidic connection of suction chamber 9 and pressure chamber 10 is possible separately from the fluidic connection of suction chamber 9 with pressure chamber 10 via the high-pressure pump 3.

There is a bypass valve 13 arranged in the bypass line 12. A free cross-sectional area of the bypass line 12 can be adjusted via the bypass valve 13. This allows the pressure in the pressure chamber 10 to be regulated. With a larger free cross-sectional area, the pressure equalization between the pressure chamber 10 and the suction chamber 9 is effected to a greater extent. If there is to be a high pressure in the pressure chamber 10, the free cross-sectional area of the bypass line 12 is reduced via the bypass valve 13. The larger the free cross-sectional area of the bypass line 12, the greater is the volume flow through the bypass line 12 during operation, with otherwise unchanged conditions.

The bypass valve 13 may be adjusted between a fully closed state and a fully open state, in stages or continuously. Between the fully closed state and the fully open state, the bypass valve 13 may have different degrees of closure. In the embodiment, the bypass valve 13 is continuously adjustable, at least partially. It may also be provided that the bypass valve is continuously adjustable without interruption between the fully closed state and the fully open state.

The magnitude of the volumetric flow of the liquid in the main line 5 can be set in dependence on the degree of closure of the bypass valve 13. The more the bypass valve 13 is closed, the smaller is the free cross-sectional area of the bypass line 12. The more the bypass valve 13 is closed, the greater is the volumetric flow of the liquid in the main line 5. The more the bypass valve 13 is closed, the greater is the volumetric flow of the liquid in the main line 5 that is present at the spray opening 6.

The bypass valve 13 can be adjusted via the operator-controlled element 7. This serves to set the free cross-sectional area of the bypass line 12. By adjustment of the bypass valve 13, the pressure in the main line 5, in particular in the pressure chamber 10, can be regulated, in particular at the spray opening 6. Via the operator-controlled element 7, both the main line valve 8 can be switched between the open state 40 and the closed state 20, and the bypass valve 13 can be adjusted.

The sprayer 11 is movable relative to the pump unit 18. Between the pump unit 18 and the sprayer 11, in the embodiment the main line 5 is realized as a flexible hose. The spray opening 6 is arranged on the sprayer 11. The sprayer 11 can be directed with its spray opening 6 toward an object that is to be cleaned. The sprayer 11 is handheld. The operator-controlled element 7 is arranged on the sprayer 11. A user can guide the sprayer 11 with one hand and simultaneously operate the operator-controlled element 7 with the same hand.

The handheld sprayer 11 has a handle region 14. The operator-controlled element 7 is arranged in the handle region 14. The pressure washer apparatus 1 is configured such that a user can hold the handheld sprayer appliance 11 with one hand by gripping the handle region 14 and can simultaneously actuate the operator-controlled element 7 with a finger of the same hand. In the embodiment, the finger is the index finger. Actuation of the operator-controlled element 7 with the thumb is not provided in the embodiment.

The operator-controlled element 7 has an unactuated state 30. The unactuated state 30 is represented in FIG. 1. The operator-controlled element 7 has an actuated state 50. The actuated state 50 is represented in FIG. 2. The operator-controlled element 7 is preloaded in the unactuated state 30. A spring, not represented in the figures, may serve for this purpose. The operator-controlled element 7 is adjustable within an adjustment range 31. The operator-controlled element 7 can assume various adjustment positions within the adjustment range 31. It is provided that the actuated state of the operator-controlled element 7 includes a plurality of different adjustment positions. It may be provided that the operator-controlled element 7 is only adjustable in stages. In the embodiment, the operator-controlled element is continuously adjustable in adjustment positions within the adjustment range 31.

The pressure washer apparatus 1 includes a detector 15. The detector 15 is configured to detect an adjustment position of the operator-controlled element 7. The detector 15 may detect any continuous adjustment position of the operator-controlled element 7 within the adjustment range 31. It may be provided that the detector 15 is a Hall sensor. In the embodiment, the detector 15 is a potentiometer. The operator-controlled element 7 and the detector 15 are arranged on the sprayer 11 in such a way that detection of the adjustment position of the operator-controlled element 7 is possible. The operator-controlled element 7 acts in combination with the detector 15.

The pressure washer apparatus 1 is configured such that the bypass valve 13 sets the size of the free cross-sectional area of the bypass line 12 in dependence on the adjustment position of the operator-controlled element 7. For this purpose, the detector 15 detects the adjustment position of the operator-controlled element 7 and generates a signal on the basis of which the bypass valve 13 is adjusted. In the embodiment, part of this signal is an initial signal 24. The initial signal 24 is generated by the detector 15 and forwarded to a transmission unit 21. In the embodiment, the signal 24 is an electrical signal. The initial signal 24 is forwarded to the transmission unit 21 via a signal line, in the embodiment via a power cable. It may also be provided that an electrical or electromagnetic signal is used directly to adjust the bypass valve 13. In the embodiment, the transmission unit 21 is arranged on the sprayer 11. The bypass valve 13 can be adjusted via the signal triggered by the operator-controlled element 7. In the embodiment, the signal can be transmitted wirelessly. On the basis of the initial signal 24 transmitted from the detector 15 to the transmission unit 21, an electromagnetic signal 25 is generated in the transmission unit 21. The electromagnetic signal 25 is part of the signal emitted by the operator-controlled element 7 for setting the free cross-sectional area of the bypass line 12.

The pressure washer apparatus 1 has a controller 22. The controller 22 is arranged in the pump unit 18. The electromagnetic signal 25 is transmitted from the transmission unit 21 to the controller 22. The electromagnetic signal 25 received by the controller 22 is used to adjust the free cross-sectional area of the bypass line 12 via the bypass valve 13.

The bypass valve 13 can be adjusted via a positioning motor 16. The positioning motor 16 is arranged in the pump unit 18. Via the positioning motor 16, the bypass valve 13 can be adjusted in such a way that the free cross-sectional area of the bypass line 12 can be set. On the basis of the electromagnetic signal 25 received in the controller 22 from the transmission unit 21, an end signal 26 is generated in the controller 22, which is transmitted to the positioning motor 16. In the embodiment, the end signal 26 is transmitted electrically via a cable. However, it may also be provided that the end signal is transmitted wirelessly. The end signal 26 is part of the signal emitted by the operator-controlled element 7 for adjusting the free cross-sectional area of the bypass line 12. The positioning motor 16 adjusts the bypass valve 13 on the basis of the end signal 26. Via the positioning motor 16, the bypass valve 13 can be adjusted in such a way that a continuous adjustment of the size of the free cross-sectional area of the bypass line 12 is possible. The size of the free cross-sectional area can be continuously adjusted via the operator-controlled element 7.

The operator-controlled element 7 is arranged on the sprayer 11. The operator-controlled element 7 is in particular arranged on the gun. The operator-controlled element 7 is arranged in the handle region 14. The opening of the main line valve 8 by the operator-controlled element 7 may be effected mechanically. In the embodiment, however, this is also effected by a main line signal 27 sent from the detector 15 to the main line valve 8. In the embodiment, this main line signal 27 is an electrical signal. As soon as the operator-controlled element 7 is in the actuated state 50—that is, no longer in the unactuated state 30—this is detected by the detector 15. The detector 15 generates the main line signal 27, which is transmitted to the main line valve 8. This main line signal 27 causes the main line valve 8 to be brought from the closed state 20 to the open state 40. As long as the operator-controlled element 7 is in the actuated state 50, the main line signal 27 that continues to be transmitted from the detector 15 to the main line valve 8 ensures that the main line valve 8 is in the open state 40.

The pressure washer apparatus 1 is configured such that, when the operator-controlled element 7 is in the unactuated state 30, the bypass valve 13 is set in such a way that the free cross-sectional area of the bypass line 12 is maximal. The pressure washer apparatus 1 is of such a structural configuration that before a reduction of the maximal free cross-sectional area of the bypass line triggered by the operator-controlled element 7, the main line valve 8 is switched from the closed state 20 to the open state 40 via the operator-controlled element 7. The bypass valve 13 is opened only after the main line valve 8 has been opened.

The structural configuration of the pressure washer apparatus 1 is such that, before the operator-controlled element 7 is brought from the actuated state 50 of the operator-controlled element 7 to the unactuated state 30 of the operator-controlled element 7, the bypass valve 13 is set such that the free cross-sectional area of the bypass line 12 is increased. The bypass valve 13 is at least partially opened before the main line valve 8 is brought from the open state 40 to the closed state 20.

As represented in FIG. 2, the operator-controlled element 7 can be adjusted, along a positioning path 32, from a rest position 28 to adjustment positions with increasing distance from the rest position 28. The operator-controlled element 7 assumes the maximum distance from the rest position 28 in an end position 38. The pressure washer apparatus 1 is configured such that the bypass valve 13 reduces and/or at least does not increase the free cross-sectional area of the bypass line 12 as the distance of the operator-controlled element 7 from the rest position 28 increases. As the distance of the operator-controlled element 7 from the rest position 28 increases, the pressure in the main line 5, in particular in the pressure chamber 10, increases. A lesser volume of the liquid delivered by the high-pressure pump 3 can flow back from the pressure chamber 10 into the suction chamber 9 via the bypass line 12. In the end position 38, the pressure in the main line 5, in particular in the pressure chamber 10 for the open state 40 of the main line valve 8 is maximal.

The distance from the rest position 28 relates to the distance of a reference point on the operator-controlled element 7. In the embodiment, the operator-controlled element 7 is a lever that can be pivoted about a pivot axis 23. In the embodiment, the reference point is the point on the operator-controlled element 7 at the greatest distance from the pivot axis 23. In the embodiment, the rest position 28 is defined by the position of the reference point when the operator-controlled element 7 is not actuated.

Upon actuation of the operator-controlled element 7 realized as a lever, when the operator-controlled element 7 is in the rest position 28, the operator-controlled element 7—and thus also the reference point—is pivoted along a positioning path 32. In this case, the positioning path 32 is a circular line segment. The distance of the operator-controlled element 7 from the rest position 28 corresponds to the distance of the reference point from the rest position 28 measured along the positioning path 32 that is a circular line segment. It may also be provided to measure the distance in the form of an angular distance of the reference point from the rest position, with regard to a pivot movement about the pivot axis 23.

The pressure washer apparatus 1 is configured such that, via the operator-controlled element 7, it is possible for the pressure in the pressure chamber 10 to be set continuously while liquid is being sprayed from the spray opening 6.

In the embodiment, the operator-controlled element 7 is a single component in which the functions of both the actuation of the main line valve 8 and the actuation of the bypass valve 13 are combined. The operator-controlled element 7 is realized in one piece. The operator-controlled element 7 can be operated with a single finger.

The pressure washer apparatus 1 is configured such that actuation of the operator-controlled element 7 by a user during use of the pressure washer apparatus 1 is possible both for switching the main line valve 8 between the open state 40 and the closed state 20 and for adjusting the bypass valve 13 using only one finger, namely the index finger, the middle finger, the ring finger or the little finger.

The pressure washer apparatus 1 is configured such that the actuation of the main line valve 8 to switch the main line valve 8 between the open state 40 and the closed state 20, and the actuation of the bypass valve 13 to adjust the bypass valve 13, can be triggered by actuation of the operator-controlled element 7 via a single continuous movement of a single finger. In particular, during the single continuous actuation, the main line valve 8 and then the bypass valve 13 are actuated in succession. Depending on the operating state, the continuous movement is effected in the opposite direction. Accordingly, during the single continuous actuation, the bypass valve 13 and then the main line valve 8 are actuated in succession.

During travel along the positioning path 32, starting from the rest position 28, upon actuation of the operator-controlled element 7, an adjustment of the operator-controlled element 7 from the rest position 28 is first detected by the detector 15. The detector 15 then sends the main line signal 27 to the main line valve 8, which is thereupon brought from the closed state 20 to the open state 40. It is only when the operator-controlled element 7 is adjusted further along the positioning path 32, that is, when the operator-controlled element 7, realized as a lever, is moved further away from the rest position 28, that the detector 15 transmits an initial signal 24 to the transmission unit 21, on the basis of which a reduction of the maximum free cross-sectional area of the bypass line 12 is effected by the bypass valve 13 and the positioning motor 16.

The operator-controlled element 7 is brought from the actuated state 50 to the unactuated state 30 in reverse order. When the operator-controlled element 7, realized as a lever, approaches the rest position 28, first the free cross-sectional area of the bypass line 12 is produced by adjustment the bypass valve 13 via the positioning motor 16. It is only when the free cross-sectional area of the bypass line 12 is maximal that the main line valve 8 is brought from the open state 40 to the closed state 20 on the basis of the absence of main line signal 27 from the detector 15, which detects a corresponding adjustment position of the operator-controlled element 7 realized as a lever. It may also be provided that another signal is provided for this instead of the absence of the main line signal 27.

It is understood that the foregoing description is that of the preferred embodiments of the invention and that various changes and modifications may be made thereto without departing from the spirit and scope of the invention as defined in the appended claims.

The invention claimed is:

1. A pressure washer apparatus comprising:

a connection for a liquid source;

a high-pressure pump;

a main line through which, via said high-pressure pump, liquid can be conveyed from said connection to a spray opening of said main line;

a main line valve arranged in said main line;

a handheld sprayer, wherein said spray opening is arranged on said handheld sprayer;

a lever arranged on said handheld sprayer;

said main line valve being configured, when in a closed state, to prevent liquid from flowing through said main line;

said main line valve being configured, when in an open state, to allow liquid to flow through said main line;

said main line valve being switchable between said open state and said closed state via said lever;

said main line having a suction chamber between said connection and said high-pressure pump;

said main line having a pressure chamber between said high-pressure pump and said spray opening;

said pressure chamber being fluidically connected to said suction chamber via a bypass line;

a bypass valve arranged in said bypass line;

said bypass line defining a free cross-sectional area settable via said bypass valve for regulating a pressure in said pressure chamber; and, said bypass valve being adjustable via said lever for setting said free cross-sectional area of said bypass line.

2. The pressure washer apparatus of claim 1, wherein said handheld sprayer includes a handle region configured to be gripped by a user so as to hold said handheld sprayer; and, said lever is configured to be actuated by the user with one finger while gripping said handle region.

3. The pressure washer apparatus of claim 1 further comprising a detector configured to detect an adjustment position of said lever.

4. The pressure washer apparatus of claim 3, wherein said detector is a potentiometer or a Hall sensor.

5. The pressure washer apparatus of claim 3, wherein said bypass valve is configured to set a size of said free cross-sectional area in dependence upon the adjustment position of said lever.

6. The pressure washer apparatus of claim 3, wherein a size of said free cross-sectional area is continuously adjustable via said lever.

7. The pressure washer apparatus of claim 1, wherein said bypass valve is adjustable via a positioning motor.

8. The pressure washer apparatus of claim 1, wherein said bypass valve is adjustable via a signal triggered by said lever.

9. The pressure washer apparatus of claim 8, wherein the signal is transmitted wirelessly.

10. The pressure washer apparatus of claim 1 further comprising a motor configured to drive said high-pressure pump.

11. The pressure washer apparatus of claim 10, wherein said motor is an induction motor or a brushless DC motor.

12. The pressure washer apparatus of claim 1, wherein the pressure washer apparatus is configured such that said bypass valve is set such that the free cross-sectional area of the bypass line is maximal when said lever is in an unactuated state.

13. The pressure washer apparatus of claim 12, wherein the pressure washer apparatus is of such a structural configuration that said main line valve is switched from said closed state to said open state via the lever before a reduction of said free cross-sectional area of said bypass line triggered by said lever.

14. The pressure washer apparatus of claim 12, wherein the pressure washer apparatus is of such a structural configuration that said free cross-sectional area of said bypass line is increased via said lever before said main line valve is brought from said open state to said closed state via said lever.

15. The pressure washer apparatus of claim 1, wherein said lever is adjustable from an unactuated state, from an unactuated rest position along a positioning path into adjustment positions at an increasing distance from said rest position, and the pressure washer apparatus is configured such that, as the distance between said lever and said rest position increases, said bypass valve reduces said free cross-sectional area of said bypass line.

16. The pressure washer apparatus of claim 1, wherein the pressure washer apparatus is configured such that the pressure in the pressure chamber is continuously settable via said lever while liquid is being sprayed from said spray opening.

17. The pressure washer apparatus of claim 1, wherein said lever is a single component combining functions of both an actuation of said main line valve and an actuation of said bypass valve.

* * * * *